United States Patent
Yen et al.

(10) Patent No.: US 10,474,615 B2
(45) Date of Patent: Nov. 12, 2019

(54) HUB

(71) Applicant: Nuvoton Technology Corporation, Hsinchu (TW)

(72) Inventors: Shih-Hsuan Yen, Hsinchu (TW); Chao-Chiuan Hsu, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 0 days.

(21) Appl. No.: 15/866,462

(22) Filed: Jan. 10, 2018

(65) Prior Publication Data

US 2018/0267921 A1    Sep. 20, 2018

(30) Foreign Application Priority Data

Mar. 17, 2017 (TW) .............................. 106108869 A (51) Int. Cl.
| | |
|---|---|
| *G06F 13/40* | (2006.01) |
| *G06F 13/38* | (2006.01) |
| *G06F 13/20* | (2006.01) |
| *G06F 13/42* | (2006.01) |

(52) U.S. Cl.
CPC .......... *G06F 13/4081* (2013.01); *G06F 13/20* (2013.01); *G06F 13/382* (2013.01); *G06F 13/4004* (2013.01); *G06F 13/4221* (2013.01)

(58) Field of Classification Search
None
See application file for complete search history.

(56) References Cited

U.S. PATENT DOCUMENTS

| | | | | |
|---|---|---|---|---|
| 7,788,451 B2* | 8/2010 | Larson | ................... | G06F 13/161 |
| | | | | 711/138 |
| 8,112,571 B1* | 2/2012 | Letourneur | ......... | G06F 13/4295 |
| | | | | 710/306 |
| 10,236,972 B2* | 3/2019 | Sachs | ....................... | G06F 13/36 |
| 2002/0180592 A1* | 12/2002 | Gromov | ................ | H04B 3/548 |
| | | | | 370/200 |
| 2004/0049602 A1* | 3/2004 | MacBride | ............... | H04L 43/00 |
| | | | | 709/250 |
| 2007/0255855 A1* | 11/2007 | Knapp | .................. | H04J 3/0605 |
| | | | | 709/248 |
| 2010/0141050 A1* | 6/2010 | Saito | ...................... | H01H 9/563 |
| | | | | 307/141 |
| 2013/0335044 A1* | 12/2013 | Raffel | ..................... | H02M 3/02 |
| | | | | 323/234 |
| 2015/0227485 A1* | 8/2015 | Maung | ................ | G06F 13/4022 |
| | | | | 710/316 |
| 2016/0373372 A1* | 12/2016 | Gillon | ..................... | H04L 47/74 |

FOREIGN PATENT DOCUMENTS

| | | |
|---|---|---|
| TW | 200945043 | 11/2009 |
| TW | I510929 | 12/2015 |
| TW | I557569 | 11/2016 |
| WO | 2015047945 | 4/2015 |

* cited by examiner

*Primary Examiner* — Michael Sun
(74) *Attorney, Agent, or Firm* — JCIPRNET (57) ABSTRACT

A hub including a first connection interface, a second connection interface, and a signal bypass circuit is provided. The first connection interface has a first pin to receive a first connection message. The second connection interface has a second pin to transmit the first connection message. The signal bypass circuit is coupled to the first pin and the second pin to decide whether to bypass the first pin and the second pin based on the first connection message.

3 Claims, 6 Drawing Sheets

HUB

CROSS-REFERENCE TO RELATED APPLICATION

This application claims the priority benefit of Taiwan application serial no. 106108869, filed on Mar. 17, 2017. The entirety of the above-mentioned patent application is hereby incorporated by reference herein and made a part of this specification.

BACKGROUND OF THE INVENTION

Field of the Invention

The invention relates to a hub, particularly a hub having a signal bypass function.

Description of Related Art

The external interfaces of electronic devices reduce in size as the electronic devices are manufactured thinner and lighter, leading to a continual decrease in the number of external devices that can be directly coupled to the electronic devices. When coupling too many external devices, users would apply a hub to connect the external devices to an electronic device. Additionally, as communication technology progresses, external devices are able to perform simple communication with the electronic devices to enable the synchronized operation between the external devices and the electronic devices. As a result, a circuit of the hub must be designed in consideration of the interaction between the external devices and the electronic devices to ensure their smooth connection and avoid interfering with their synchronized operation.

SUMMARY OF THE INVENTION

The invention provides a hub capable of bypassing a first pin and a second pin, so as to avoid interfering with a synchronized operation between an external device and an electronic device.

A hub of the invention includes a first connection interface, a second connection interface, and a signal bypass circuit. The first connection interface has a first pin to receive a first connection message. The second connection interface has a second pin configured to transmit the first connection message. The signal bypass circuit is coupled to the first pin and the second pin, so as to decide whether to bypass the first pin and the second pin based on the first connection message.

A hub of the invention includes a first universal serial bus (USB) c-type interface, a second USB c-type interface, a first transmission/receipt circuit, a second transmission/receipt circuit, a controlling circuit, and a signal bypass circuit. The first USB c-type interface has a first channel configuration pin to receive a first connection message. The first transmission/receipt circuit is coupled to the first USB c-type interface and receives the first connection message to provide a connection configuration signal. The second USB c-type interface has a second channel configuration pin configured to transmit the first connection message. The second transmission/receipt circuit is coupled to the second channel configuration pin and is configured to restore the connection configuration signal to the first connection signal. The controlling circuit is coupled to the first transmission/receipt circuit and the second transmission/receipt circuit, so as to receive the connection configuration signal and provide a transmission switch signal based on the connection configuration signal. The signal bypass circuit is coupled to the first transmission/receipt circuit, the second transmission/receipt circuit, and the controlling circuit, so as to decide whether to bypass the first transmission/receipt circuit and the second transmission/receipt circuit based on the connection configuration signal and the transmission switch signal.

A hub of the invention includes a first pin, a second pin, and a signal bypass circuit. The first pin is coupled to a first universal serial bus (USB) c-type device to receive a first connection message. The second pin is coupled to a second USB c-type device to transmit the first connection message to the second USB c-type device. The signal bypass circuit is coupled to the first pin and the second pin to decide whether to bypass the first pin and the second pin based on the first connection message.

Based on the above, the signal bypass circuit of the hub in the embodiment of the invention is coupled to the first pin of the first connection interface and the second pin of the second connection interface, so as to decide whether to bypass the first pins and the second pins based on the first connection message received by the first pin. In this way, the hub is able to bypass the first pin and the second pin when the hub cannot intermediate a host and the external device, so as to avoid interfering with the synchronized operation between the external device and the electronic device.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
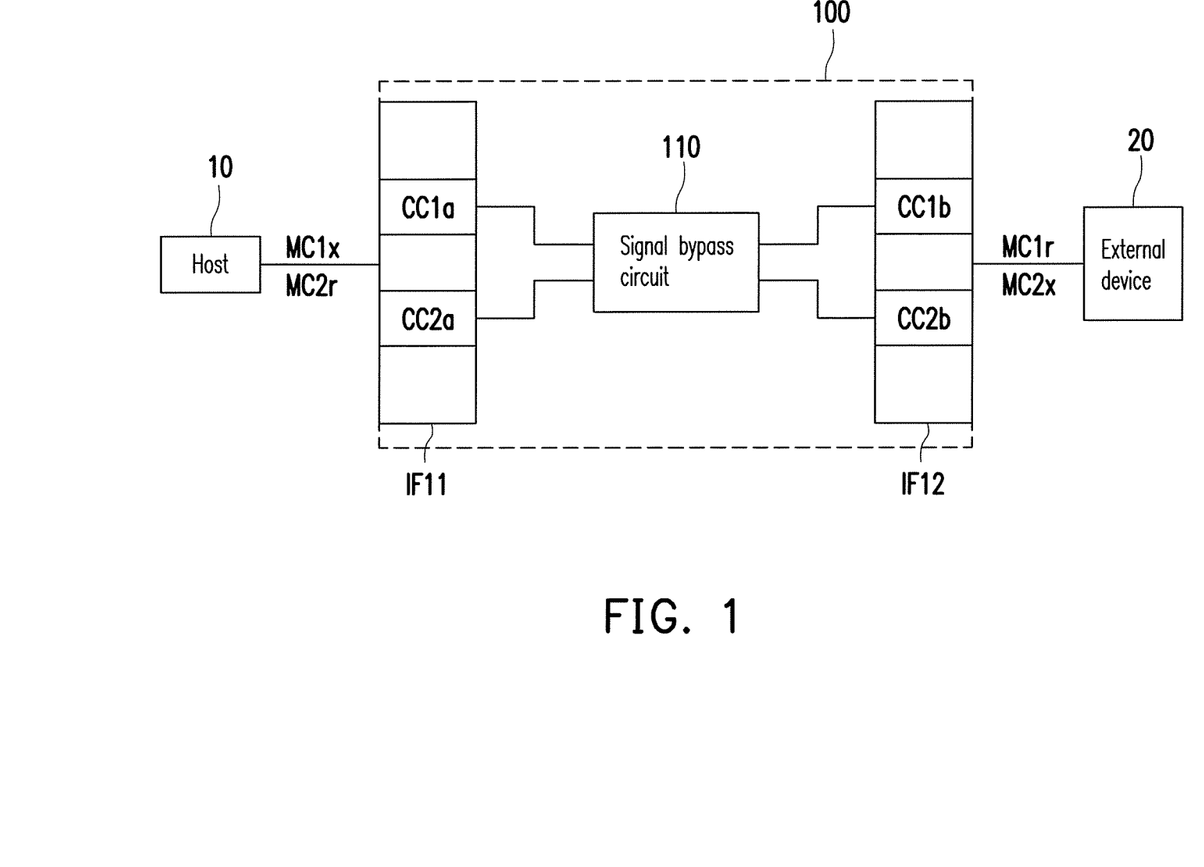
FIG. 1 is a systematic diagram of a hub according to the first embodiment of the invention.

FIG. 1 is a systematic diagram of a hub according to the first embodiment of the invention. Please refer to FIG. 1. In this embodiment of the invention, a hub 100 includes a first connection interface IF11, a second connection interface IF12, and a signal bypass circuit 110. The first connection interface IF11 is adapted to be coupled to a host 10 and the second connection interface IF12 is adapted to be coupled to an external device 20. The external device 20 may be an adapter, a security key, or a device similar thereto.

In this embodiment of the invention, the first connection interface IF11 and the second connection interface IF12 may be a universal serial bus (USB) c-type interface. In other words, the first connection interface IF11 (i.e. a first USB c-type interface) at least has first pins, which are first channel configuration pins CC1a and CC2a. The second connection interface IF12 (i.e. a second USB c-type interface) at least has second pins, which are second channel configuration pins CC1b and CC2b. Accordingly, the host 10 and the external device 20 are respectively a USB c-type device having the USB c-type interface.

The first pin (such as the first channel configuration pin CC1a or CC2a) is configured to receive a first connection message MC1x provided by the host 10. The second pin (such as the second channel configuration pin CC1b or CC2b) is configured to transmit a first connection message MC1r passing through the signal bypass circuit 110 to the external device 20. Meanwhile, the signal bypass circuit 110 decides whether to bypass the first pin (such as the first channel configuration pin CC1a or CC2a) and the second pin (such as the second channel configuration pin CC1b or CC2b) based on the first connection message MC1x.

On the contrary, the second pin (such as the second channel configuration pin CC1b or CC2b) is configured to receive a second connection message MC2x provided by the external device 20. The first pin (such as the first channel configuration pin CC1a or CC2a) is configured to transmit a second connection message MC2r passing through the signal bypass circuit 110 to the host 10. Meanwhile, the signal bypass circuit 110 decides whether to bypass the first pin (such as the first channel configuration pins CC1a or CC2a) and the second pin (such as the second channel configuration pin CC1b or CC2b) based on the second connection message MC2x.

In this embodiment of the invention, the signal bypass circuit 110 may alternately bypass and disconnect. Alternatively, the signal bypass circuit 110 may only bypass the first pin (such as the first channel configuration pins CC1a or CC2a) and the second pin (such as the second channel configuration pin CC or CC2b) once when the hub 100 is simultaneously coupled to the host 10 and the external device 20. And, the signal bypass circuit 110 may disconnect from the first pin (such as the first channel configuration pin CC1a or CC2a) and the second pin (such as the second channel configuration pins CC1b or CC2b) when the hub 100 disconnects from either of the host 10 and the external device 20. Whether bypassing of the signal bypass circuit 110 may be decided according to information sensed by a signal, a content of a register, or an operation of firmware.

In this embodiment of the invention, the first pin (such as the first channel configuration pin CC1a or CC2a) and the second pin (such as the second channel configuration pin CC1b or CC2b) may be pre-set to be bypassed.

Additionally, assuming the signal bypass circuit 110 is disconnected from the first pin (such as the first channel configuration pin CC1a or CC2a) and the second pin (such as the second channel configuration pin CC or CC2b) before the host 10 transmits the first connection message MC1x, then the signal bypass circuit 110 continues to disconnect from the first pin (such as the first channel configuration pin CC1a or CC2a) and the second pin (such as the second channel configuration pin CC1b or CC2b) when the first pin (such as the first channel configuration pin CC1a or CC2a) does not receive the first connection message MC1x; and the signal bypass circuit 110 bypasses the first pin (such as the first channel configuration pin CC1a or CC2a) and the second pin (such as the second channel configuration pin CC or CC2b) when the first pin (such as the first channel configuration pin CC1a or CC2a) receives the first connection message MC1x.

Alternatively, the signal bypass circuit 110 disconnects from the first pin (such as the first channel configuration pin CC1a or CC2a) and the second pin (such as the second channel configuration pin CC1b or CC2b) and is replying the message in advance when the signal bypass circuit 110 determines that the first connection message MC1x can be replied based on head data of the first connection message MC1x. The signal bypass circuit 110 bypasses the first pin (such as the first channel configuration pin CC1a or CC2a) and the second pin (such as the second channel configuration pin CC1b or CC2b) but does not react to the first connection message MC1x when the signal bypass circuit 110 determines that the first connection message MC1x cannot be replied based on the head data of the first connection message MC1x.

Further in the alternative, the signal bypass circuit 110 disconnects from the first pin (such as the first channel configuration pin CC1a or CC2a) and the second pin (such as the second channel configuration pin CC1b or CC2b) when the first connection message MC1x is not transmitting a command. The signal bypass circuit 110 bypasses the first pin (such as the first channel configuration pin CC1a or CC2a) and the second pin (such as the second channel configuration pin CC1b or CC2b) when the first connection message MC1x is transmitting a command.

Figure 2:
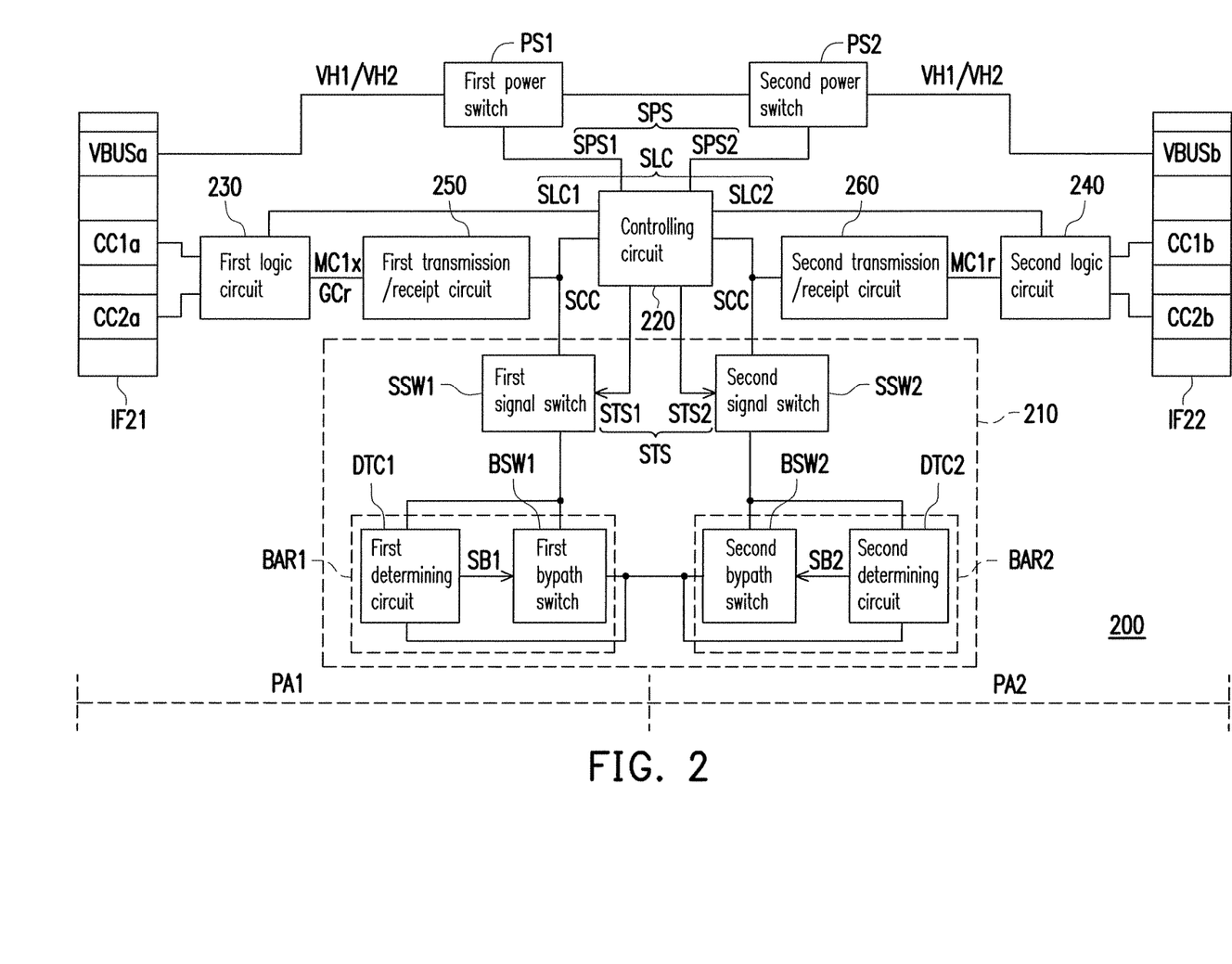
FIG. 2 is a systematic diagram of a hub according to the second embodiment of the invention.

FIG. 2 is a systematic diagram of a hub according to the second embodiment of the invention. Please refer to FIG. 1 and FIG. 2, wherein identical or similar reference numerals are used on identical or similar elements. In this embodiment of the invention, a hub 200 includes a first connection interface IF21, a second connection interface IF22, a signal bypass circuit 210, a controlling circuit 220, a first logic circuit 230, a second logic circuit 240, a first transmission/receipt circuit 250, a second transmission/receipt circuit 260, a first power switch PS1, and a second power switch PS2.

In this embodiment of the invention, the first connection interface IF21 depicts not only first channel configuration pins CC1a and CC2a, but a first power pin VBUSa. Furthermore, the second connection interface IF22 depicts not only second channel configuration pins CC1b and CC2b, but a second power pin VBUSb.

A first end of the first power switch PS1 is coupled to the first power pin VBUSa. A controlling end of the first power switch PS1 is coupled to the controlling circuit 220, so as to receive a first power switch signal SPS1 of a power switch signal SPS provided by the controlling circuit 220. A first end of the second power switch PS2 is coupled to the second power pin VBUSb. A controlling end of the second power switch PS2 is coupled to the controlling circuit 220, so as to receive a second power switch signal SPS2 of the power switch signal SPS provided by the controlling circuit 220. A second end of the second power switch PS2 is coupled to a second end of the first power switch PS1.

The first logic circuit 230 is coupled to the first channel configuration pins CC1a and CC2a, the controlling circuit 220, and the first transmission/receipt circuit 250, so as to set a voltage level of the first channel configuration pins CC1a and CC2a based on a first level setting signal SLC1 of a level setting signal SLC provided by the controlling circuit 220. The second logic circuit 240 is coupled to the second channel configuration pins CC and CC2b, controlling circuit 220, and the second transmission/receipt circuit 260, so as to set a voltage level of the second channel configuration pins CC1b and CC2b based on a second level setting signal SLC2 of the level setting signal SLC provided by the controlling circuit 220.

The first transmission/receipt circuit 250 is coupled between the signal bypass circuit 210, the controlling circuit 220, and the first logic circuit 230. In other words, the first transmission/receipt circuit 250 is coupled between the first channel configuration pins CC1a and CC2a, the signal bypass circuit 210, and the controlling circuit 220. The second transmission/receipt circuit 260 is coupled between the signal bypass circuit 210, the controlling circuit 220, and the second logic circuit 240. In other words, the second transmission/receipt circuit 260 is coupled between the second channel configuration pins CC1b and CC2b, the signal bypass circuit 210, and the controlling circuit 220.

In this embodiment of the invention, the controlling circuit 220 sets the voltage level of the first channel configuration pins CC1a and CC2a through the first level setting signal SLC1, so as to perform a matching operation between the hub 200 and a host 10 when either of the first channel configuration pins CC1a and CC2a is coupled to the host 10. Moreover, the host 10 is pre-set to provide a power voltage VH1 to the first power pin VBUSa. The first power switch PS1, however, is subjected to the first power switch signal SPS1 and remains cutoff.

The controlling circuit 220 also sets the voltage level of the second channel configuration pins CC1b and CC2b through the second level setting signal SLC2, so as to perform a matching operation between the hub 200 and an external device 20 when either of the second channel configuration pins CC1b and CC2b is coupled to the external device 20. When the external device 20 is a security key or a similar device without power-supply ability, the first power switch PS1 is subjected to the first power switch signal SPS1 and is conducted, and the second power switch PS2 is subjected to the second power switch signal SPS2 and is conducted after the hub 200 and the external device 20 finish matching, so as to provide the power voltage VH1 to the external device 20 through the second power pin VBUSb.

When the external device 20 is an adapter or a similar device, the external device 20 is pre-set to provide a power voltage VH2 to the second power pin VBUSb. Meanwhile, the controlling circuit 220 again sets the voltage level of the first channel configuration pins CC1a and CC2a through the first level setting signal SLC1, so as to perform a re-matching operation between the hub 200 and the host 10 and to further make the host 10 stop providing the power voltage VH1. The first power switch PS1 is subjected to the first power switch signal SPS1 and is conducted, and the second power switch PS2 is subjected to the second power switch signal SPS2 and is conducted after the host 10 stops providing the power voltage VH1, so as to provide the power voltage VH1 to the host 10 through the first power pin VBUSa.

On the other hand, the first channel configuration pin CC1a or CC2a may receive a first connection message MC1x provided by the host 10, and the second channel configuration pin CC1b or CC2b may receive a second connection message MC2x provided by the external device 20 when the hub 200, the host 10, and the external device 20 finish matching (or re-matching).

The first connection message MC1x is transmitted to the first transmission/receipt circuit 250 through the first logic circuit 230 when either of the first channel configuration pins CC1a and CC2a receives the first connection message MC1x provided by the host 10. The first transmission/receipt circuit 250 provides a connection configuration signal SCC to the signal bypass circuit 210 and the controlling circuit 220 after receiving the first connection message MC1x. In other words, the first connection message MC1x and the connection configuration signal SCC have the same meaning but are of different signal types.

When receiving the connection configuration signal SCC, the controlling circuit 220 provides a transmission switch signal STS to the signal bypass circuit 210 based on the connection configuration signal SCC and determines whether the connection configuration signal SCC needs to reply. The controlling circuit 220 transmits a connected signal GCr to the first channel configuration pin CC1a or CC2a through the first transmission/receipt circuit 250 when the connection configuration signal SCC (i.e. the first connection message MC1x) needs to reply the connected signal GCr. The controlling circuit 220 does not transmit the connected signal GCr when the connection configuration signal SCC does not need to reply the connected signal GCr.

Following the above, the signal bypass circuit 210 decides whether to transmit the connection configuration signal SCC to the second transmission/receipt circuit 260 based on the connection configuration signal SCC and the transmission switch signal STS. In other words, the signal bypass circuit 210 decides whether to bypass the first transmission/receipt circuit 250 and the second transmission/receipt circuit 260. The second transmission/receipt circuit 260 restores the connection configuration signal SCC to the first connection message MC1r and transmits the first connection message MC1r to the external device 20 through the second logic circuit 240 and the second channel configuration pin CC1b or CC2b when receiving the connection configuration signal SCC. In a similar manner, the second channel configuration pin CC1b or CC2b performs a signal transmission operation similar to the above when receiving the second connection message MC2x.

In this embodiment of the invention, the signal bypass circuit 210 may disconnect from the first transmission/receipt circuit 250 and the second transmission/receipt circuit 260 when the signal bypass circuit 210 does not receive the connection configuration signal SCC. The signal bypass circuit 210 may bypass the first transmission/receipt circuit 250 and the second transmission/receipt circuit 260 when the signal bypass circuit 210 receives the connection configuration signal SCC.

Alternatively, the signal bypass circuit 210 may disconnect from the first transmission/receipt circuit 250 and the second transmission/receipt circuit 260 when the signal bypass circuit 210 determines that the connection configuration signal SCC can be replied based on head data of the connection configuration signal SCC. The signal bypass circuit 210 may bypass the first transmission/receipt circuit 250 and the second transmission/receipt circuit 260 when the signal bypass circuit 210 determines that the connection configuration signal SCC cannot be replied based on the head data of the connection configuration signal SCC.

Further in the alternative, the signal bypass circuit 210 disconnects from the first transmission/receipt circuit 250 and the second transmission/receipt circuit 260 when the connection configuration signal SCC is not transmitting a command. The signal bypass circuit 210 bypasses the first transmission/receipt circuit 250 and the second transmission/receipt circuit 260 when the connection configuration signal SCC is transmitting a command.

In this embodiment of the invention, the signal bypass circuit 210 includes a first signal switch SSW1, a first bypass arbitration circuit BAR1, a second bypass arbitration circuit BAR2, and a second signal switch SSW2. The first bypass arbitration circuit BAR1 includes a first bypath switch BSW1 and a first determining circuit DTC1. The second bypass arbitration circuit BAR2 includes a second bypath switch BSW2 and a second determining circuit DTC2. A first end of the first signal switch SSW1 is coupled to the first transmission/receipt circuit 250 to receive the connection configuration signal SCC. A controlling end of the first signal switch SSW1 receives a first transmission switch signal STS1 of the transmission switch signal STS.

A first end of the first bypath switch BSW1 is coupled to a second end of the first signal switch SSW1. A controlling end of the first bypath switch BSW1 is coupled to the first determining circuit DTC1 to receive a first bypath signal SB1. The first determining circuit DTC1 is coupled to the second end of the first signal switch SSW1, the controlling end of the first bypath switch BSW1, and the second end of the first bypath switch BSW1, and receives the connection configuration signal SCC to provide the first bypath signal SB1.

A first end of the second signal switch SSW2 is coupled to the second transmission/receipt circuit 260. A controlling end of the second signal switch SSW2 receives a second transmission switch signal STS2 of the transmission switch signal STS. A first end of the second bypath switch BSW2 is coupled to a second end of the second signal switch SSW2. A controlling end of the second bypath switch BSW2 is coupled to the second determining circuit DTC2 to receive a second bypath signal SB2. The second determining circuit DTC2 is coupled to the second end of the second signal switch SSW2, the controlling end of the second bypath switch BSW2, and a second end of the second bypath switch BSW2, and receives the connection configuration signal SCC to provide the second bypath signal SB2.

In this embodiment of the invention, the controlling circuit 220 may continue to monitor the connection configuration signal SCC to determine whether the connection configuration signal SCC is correct. The controlling circuit 220 may disconnect from the signal bypass circuit 210 through the transmission switch signal STS when the connection configuration signal SCC is incorrect. The controlling circuit 220 may continue to conduct the signal bypass circuit 210 through the transmission switch signal STS when the connection configuration signal SCC is correct.

In this embodiment of the invention, the hub 200 may be divided into two main parts, i.e., a PA part and a PB part, according to a signal processing procedure. The PA part and the PB part may be respectively taken as a receiving end and a transmitting end. As shown in FIG. 2, the PA part includes the first connection interface IF21, the first logic circuit 230, the first transmission/receipt circuit 250, a left half of the signal bypass circuit 210 that is coupled to the first transmission/receipt circuit 250, and a left half of the controlling circuit 220 that is coupled to the first transmission/receipt circuit 250. The PB part includes the second connection interface IF22, the second logic circuit 240, the second transmission/receipt circuit 260, a right half of the signal bypass circuit 210 that is coupled to the second transmission/receipt circuit 260, and a right half of the controlling circuit 220 that is coupled to the second transmission/receipt circuit 260. For instance, the PA part may be taken as the receiving end and the PB part may be taken as the transmitting end when either of the first channel configuration pins CC1a and CC2a receives the first connection message MC1x provided by the host 10; the PB part may be taken as the receiving end and the PA part may be taken as the transmitting end when the second channel configuration pin CC1b or C22b receives the second connection message MC2x.

In this embodiment of the invention, the controlling circuit 220 may be constructed with a single integrated circuit (chip) to simultaneously manage the PA part and the PB part. The controlling circuit 220 may also be constructed with two chip to respectively manage the PA part and the PB part. Such construction may be decided by people with ordinary skills in the art of the field and the embodiment of the invention is not limited thereto.

Figure 3:
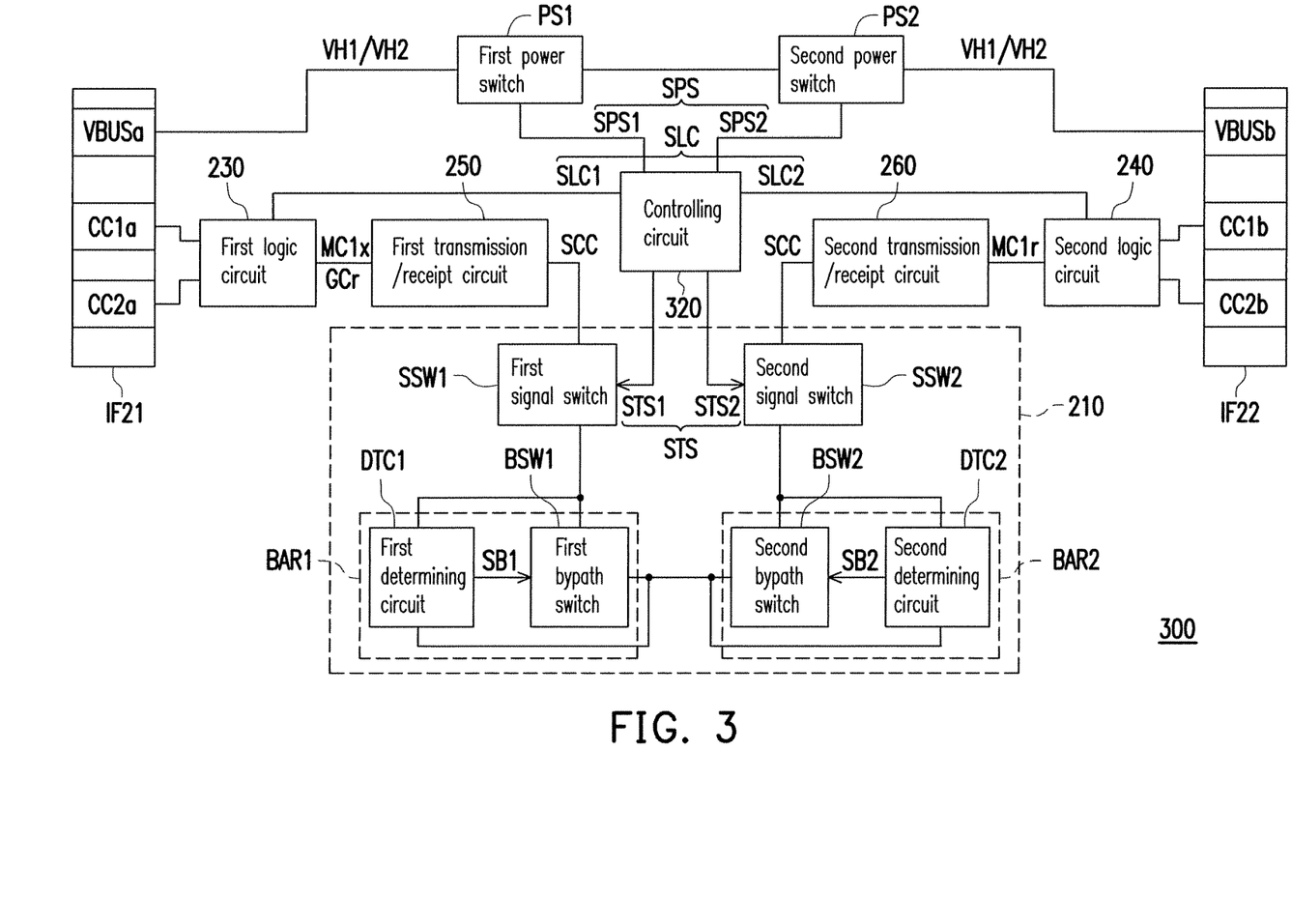
FIG. 3 is a systematic diagram of a hub according to the third embodiment of the invention.

FIG. 3 is a systematic diagram of a hub according to the third embodiment of the invention. Please refer to FIG. 1 to FIG. 3. A hub 300 is generally identical to the hub 200 but is different in a controlling circuit 320, wherein identical or similar reference numerals are used on identical or similar elements. In this embodiment of the invention, the controlling circuit 320 is not coupled to the first transmission/receipt circuit 250 and the second transmission/receipt circuit 260. In other words, a first signal switch SSW1 and a second signal switch SSW2 are conducted to reduce functions of the controlling circuit 320 and decrease a circuit area of the controlling circuit 320 when either of first channel configuration pins CC1a and CC2a is coupled to a host 10 and/or either of second channel configuration pins CC2a and CC2b is coupled to an external device 20.

Figure 4:
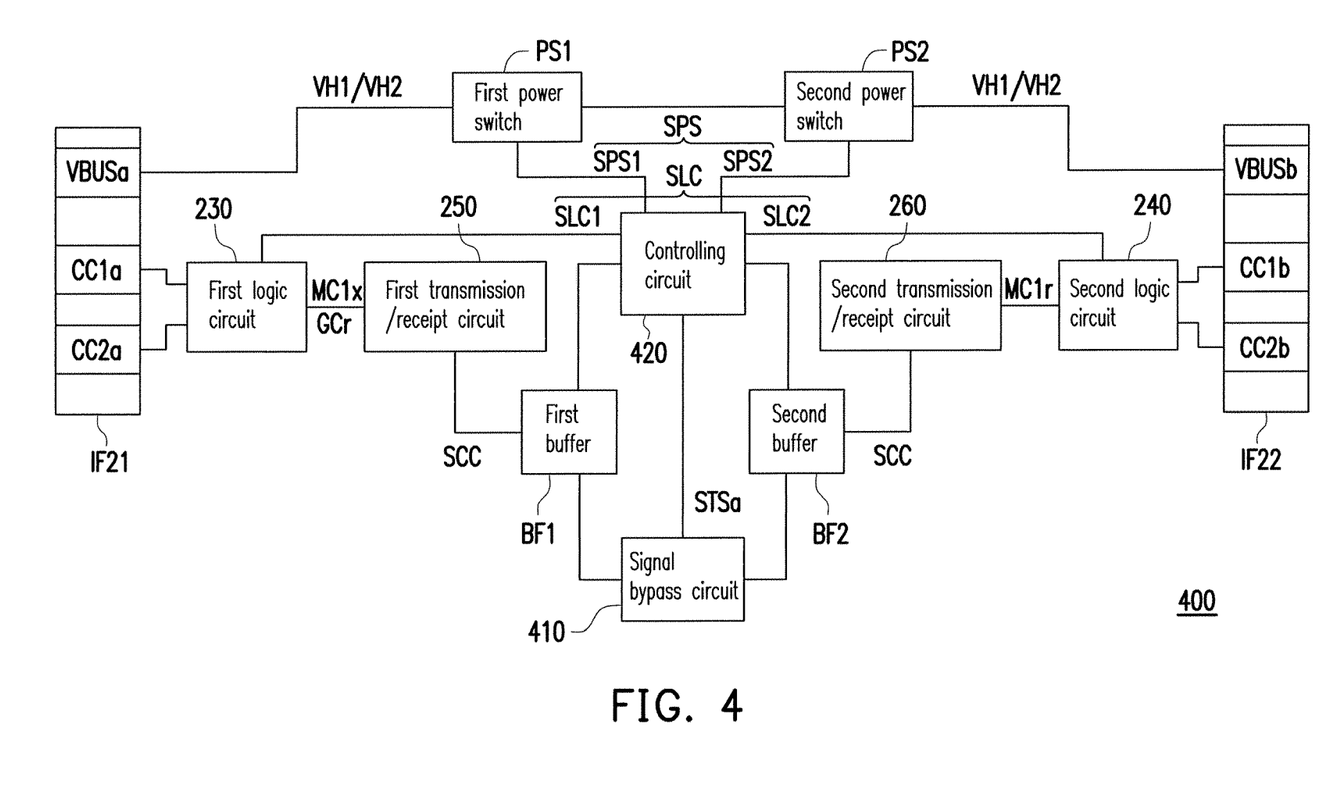
FIG. 4 is a systematic diagram of a hub according to the fourth embodiment of the invention.

FIG. 4 is a systematic diagram of a hub according to the fourth embodiment of the invention. Please refer to FIG. 2 and FIG. 4. A hub 400 is generally identical to the hub 200 but is different in a signal bypass circuit 410, a controlling circuit 420, a first buffer BF1, and a second buffer BF2, wherein identical or similar reference numerals are used on identical or similar elements.

In this embodiment of the invention, the first buffer BF1 is coupled between a first transmission/receipt circuit 250, the controlling circuit 420, and the signal bypass circuit 410, so as to buffer a connection configuration signal SCC. The second buffer BF2 is coupled between a second transmission/receipt circuit 260, the controlling circuit 420, and the signal bypass circuit 410, so as to buffer the connection configuration signal SCC.

The controlling circuit 420 reads the connection configuration signal SCC stored by the first buffer BF1 and decides whether to enable a transmission switch signal STSa based on the connection configuration signal SCC when the first channel configuration pin CC1a or CC2a receives a first connection message MC1x provided by the host 10. The signal bypass circuit 410 bypasses the first buffer BF1 and the second buffer BF2 to transmit the connection configuration signal SCC to the second buffer BF2 when the transmission switch signal STSa is enabled.

In this embodiment of the invention, the signal bypass circuit 410 may be constructed with a switch or referred to a circuit design of the signal bypass circuit 210. Nevertheless, here is determined based on a circuit design thereof, and the invention is not limited thereto.

Figure 5:
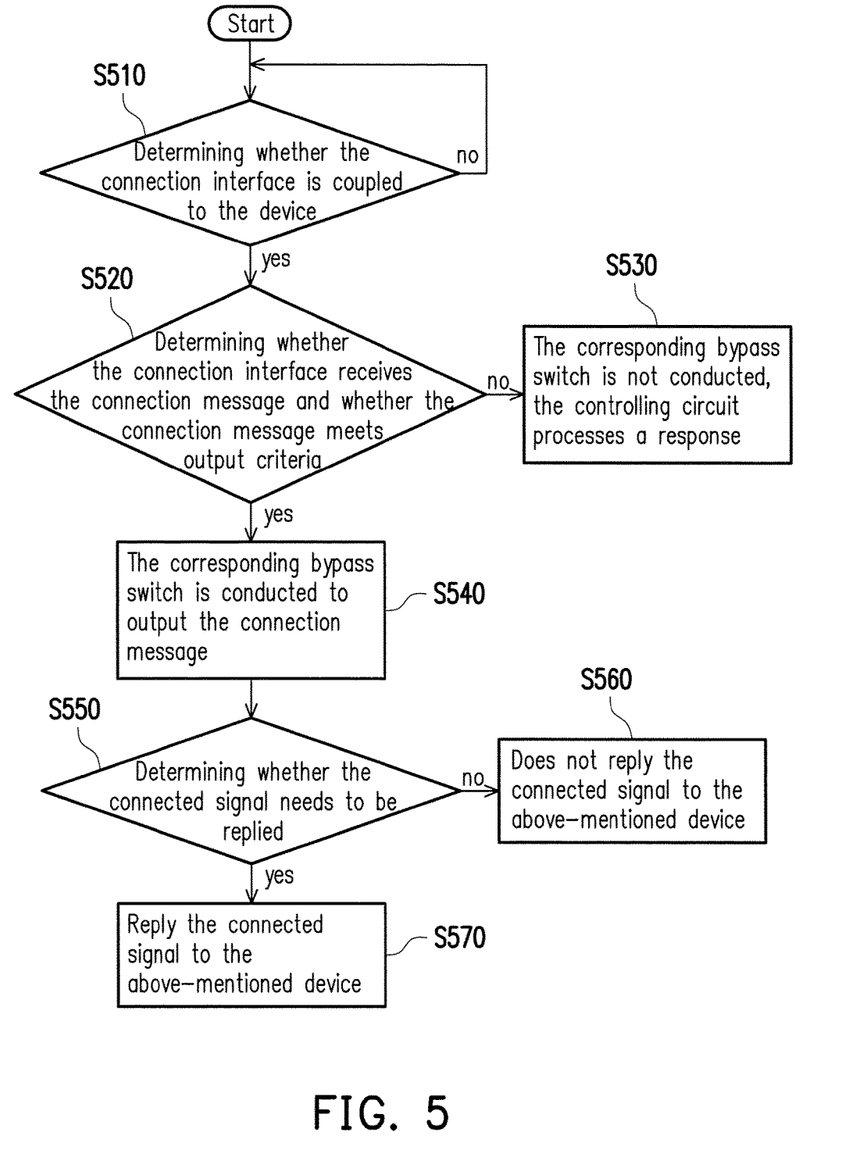
FIG. 5 is a flow chart of an operating method of a receiving end of a hub according to an embodiment of the invention.

FIG. 5 is a flow chart of an operating method of a receiving end of a hub according to an embodiment of the invention. Please refer to FIG. 5. In this embodiment of the invention, the operating method of the receiving end of the hub includes the following steps. In step S510, it is determined whether the connection interface is coupled to the device. If the connection interface is not coupled to the device, which means a determining result of the step S510 is "no", then it restarts from the step S510. If the connection interface is coupled to the device, which means the determining result of the step S510 is "yes", then it proceeds to execute step S520.

In the step S520, it is determined whether the connection interface receives the connection message and whether the connection message meets output criteria. If the connection message does not meet the output criteria, which means a determining result of the step S520 is "no", then it proceeds to execute step S530. If the connection message meets the output criteria, which means the determining result of the step S520 is "yes", then it proceeds to execute step S540. In the step S530, a corresponding bypath switch is not conducted and a response is processed by the controlling circuit. In the step S540, the corresponding bypath switch is conducted to output the connection message, and then it proceeds to execute step S550.

In the step S550, it is determined whether the connected signal needs to be replied. If the connected signal does not need to be replied, a determining result of the step S550 is "no", then it proceeds to execute step S560. If the connected signal needs to be replied, which means the determining result of the step S550 is "yes", then it proceeds to execute step S570. In the step S560, the connected message is not replied to the aforementioned device. In the step S570, the connected message is replied to the aforementioned device.

In this embodiment of the invention, the steps S550, S560, and S570 may be executed by choice. In other words, the steps S550, S560, and S570 may be executed or not executed according to a circuit design.

Figure 6:
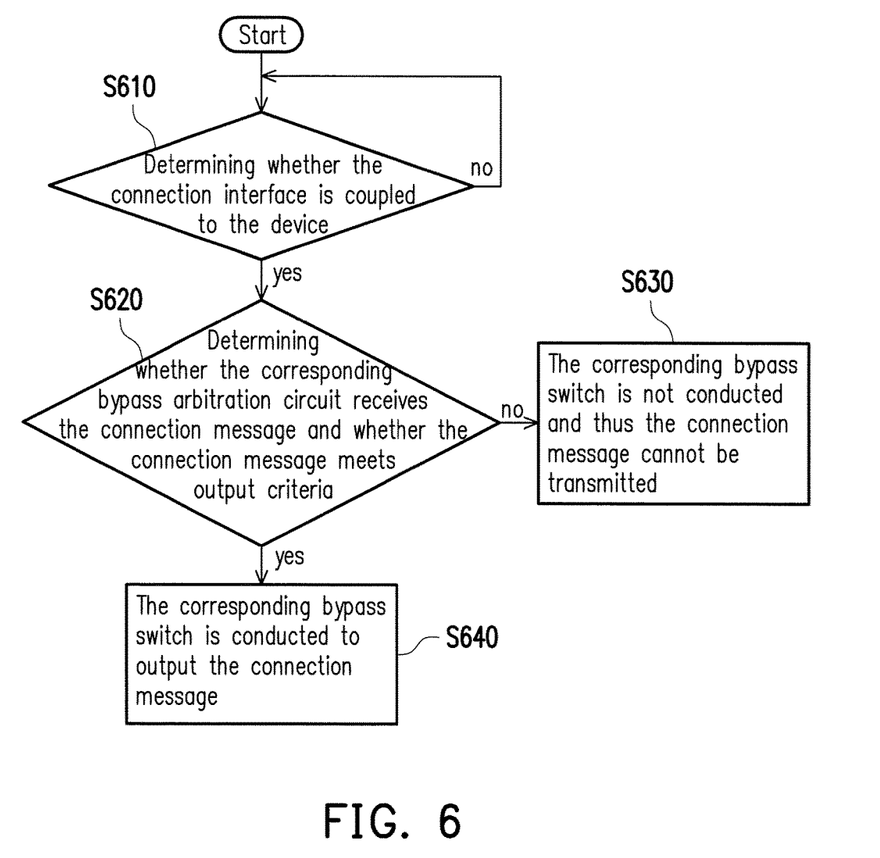
FIG. 6 is a flow chart of an operating method of a transmitting end of a hub according to an embodiment of the invention.

FIG. 6 is a flow chart of an operating method of a transmitting end of a hub according to an embodiment of the invention. Please refer to FIG. 6. In this embodiment of the invention, the operating method of the transmitting end of the hub includes the following steps. In step S610, it is determined whether the connection interface is coupled to the device. If the connection interface is not coupled to the device, which means a determining result of the step S610 is "no", then it restarts from the step S610. If the connection interface in coupled to the device, which means the determining result of the step S610 is "yes", then it proceeds to execute step S620.

In the step S620, it is determined whether the corresponding bypass arbitration circuit receives the connection message and whether the connection message meets output criteria. If the connection message does not meet the output criteria, which means a determining result of the step S620 is "no", then it proceeds to execute step S630. If the connection message meets the output criteria, which means the determining result of the step S620 is "yes", then it proceeds to execute step S640. In the step S630, a corresponding bypath switch is not conducted so that the connection message cannot be transmitted. In the step S640, the corresponding bypath switch is conducted to output the connection message.

An order of the above steps S510, S520, S530, S540, S550, S560, S570, S610, S620, S630, and S640 is used for explanation and the embodiment of the invention is not limited thereto. Moreover, details of the steps S510, S520, S530, S540, S550, S560, S570, S610, S620, S630, and S640 may be understood from the embodiments of FIG. 1 to FIG. 4 and thus are not repeated.

Based on the above, the signal bypass circuit of the hub in the embodiment of the invention is coupled to the first pin of the first connection interface and the second pin of the second connection interface, so as to decide whether to bypass the first pin and the second pin based on the first connection message received by the first pin. In this way, the hub is able to bypass the first pin and the second pin when the hub cannot intervene between the host and the external device, so as to avoid interfering with the synchronized operation between the external device and the electronic device. Furthermore, a monitoring function of the controlling circuit may be removed to decrease the circuit area of the controlling circuit.

It will be apparent to those skilled in the art that various modifications and variations can be made to the disclosed embodiments without departing from the scope or spirit of this invention. In view of the foregoing, it is intended that the invention covers modifications and variations provided that they fall within the scope of the following claims and their equivalents.

What is claimed is:

1. A hub, comprising:
   a first universal serial bus (USB) c-type interface comprising a first channel configuration pin configured to receive a first connection message;
   a first transmission/receipt circuit coupled to the first USB c-type interface and receiving the first connection message to provide a connection configuration signal;
   a second universal serial bus (USB) c-type interface comprising a second channel configuration pin configured to transmit the first connection message;
   a second transmission/receipt circuit coupled to the second channel configuration pin and configured to restore the connection configuration signal to the first connection message;
   a controlling circuit coupled to the first transmission/receipt circuit and the second transmission/receipt circuit to receive the connection configuration signal and providing a transmission switch signal based on the connection configuration signal; and
   a signal bypass circuit coupled between the first transmission/receipt circuit and the second transmission/receipt circuit in serial, and coupled to the controlling circuit to decide whether to bypass the first transmission/receipt circuit and the second transmission/receipt circuit based on the connection configuration signal and the transmission switch signal.

2. The hub of claim 1, wherein the signal bypass circuit disconnects from the first transmission/receipt circuit and the second transmission/receipt circuit when the signal bypass circuit does not receive the connection configuration signal, and the signal bypass circuit bypasses the first transmission/receipt circuit and the second transmission/receipt circuit when the signal bypass circuit receives the connection configuration signal.

3. The hub of claim 1, wherein the controlling circuit transmits a connected signal through the first transmission/receipt circuit when the connection configuration signal needs to reply the connected signal, and the controlling circuit does not transmit the connected signal when the connection configuration signal does not need to reply the connected signal.

* * * * *